(12) United States Patent
Nishio et al.

(10) Patent No.: US 7,423,702 B2
(45) Date of Patent: Sep. 9, 2008

(54) LIQUID CRYSTAL DISPLAY DEVICE

(75) Inventors: Toshiya Nishio, Tottori (JP); Toyohiro Sakai, Tottori (JP)

(73) Assignees: Sanyo Electric Co., Ltd., Osaka (JP); Tottori Sanyo Electric Co., Ltd., Tottori (JP)

(*) Notice: Subject to any disclaimer, the term of this patent is extended or adjusted under 35 U.S.C. 154(b) by 127 days.

(21) Appl. No.: 10/592,458

(22) PCT Filed: Mar. 10, 2005

(86) PCT No.: PCT/JP2005/004256

§ 371 (c)(1),
(2), (4) Date: Sep. 11, 2006

(87) PCT Pub. No.: WO2005/093503

PCT Pub. Date: Oct. 6, 2005

(65) Prior Publication Data

US 2007/0188673 A1 Aug. 16, 2007

(30) Foreign Application Priority Data

Mar. 29, 2004 (JP) ............................ 2004-096097

(51) Int. Cl.
*G02F 1/1333* (2006.01)
(52) U.S. Cl. .............................. 349/58; 349/56; 349/61
(58) Field of Classification Search .................. 349/58, 349/56, 60, 61, 139, 149, 151
See application file for complete search history.

(56) References Cited

U.S. PATENT DOCUMENTS

2006/0274223 A1* 12/2006 Hsu ............................ 349/58

(Continued)

FOREIGN PATENT DOCUMENTS

JP 05-066390 A 3/1993

(Continued)

OTHER PUBLICATIONS

International Search Report issued in PCT/JP2005/004256 dated Jun. 21, 2005.

(Continued)

*Primary Examiner*—Brian M Healy
(74) *Attorney, Agent, or Firm*—Katten Muchin Rosenman LLP (57) ABSTRACT

A liquid crystal display device (1), comprising a liquid crystal display panel and an illumination unit (10). The illumination unit (10) further comprises a housing (11) having a rectangular bottom wall face and having, at its side peripheral edge parts, cut and erected pieces ($14_1$) and ($14_2$) formed by cutting out a part of the bottom wall surface and projecting the cutout parts to the rear surface, and a frame-shaped intermediate frame (20) having a display window ($20_0$) at its center part to which an illuminating member stored in the housing (11) is fixed. The intermediate frame (20) comprises locking pieces ($23_1$) inserted into opening parts ($14_0$) formed, when the cut and erected pieces are cut and raised, at positions corresponding to the cut and erected pieces ($14_1$) and ($14_2$). When the intermediate frame (20) is fixed to the housing (11), clearances formed between the cut and erected pieces ($14_1$) and ($14_2$) and the locking pieces ($23_1$) form a lead fixing parts for holding fixing leads (4) extracted from the illuminating member. The liquid display device thus provided can easily fix the leads extracted from the housing.

8 Claims, 6 Drawing Sheets

U.S. PATENT DOCUMENTS

2007/0070646 A1\* 3/2007 Morishita .................. 362/561
2007/0188673 A1\* 8/2007 Nishio et al. ................. 349/58

FOREIGN PATENT DOCUMENTS

| JP | 2001-249621 A | 9/2001 |
| JP | A-2003-223110 | 12/2001 |
| JP | 2003-197017 A | 7/2003 |

OTHER PUBLICATIONS

Patent Abstracts of Japan for JP 05-066390, published Mar. 19, 1993.

\* cited by examiner

LIQUID CRYSTAL DISPLAY DEVICE

This application is a National Stage Entry of International Application No. PCT/JP2005/004256 filed Mar. 10, 2005 which claims priority to Japanese Application No. 2004-096097 filed Mar. 29, 2004.

TECHNICAL FIELD

The present invention relates to a liquid crystal display device and specifically to a liquid crystal display device equipped with a lead fixing part for fixing a lead extracted from a housing.

RELATED ART

Liquid crystal display devices are characterized by low power consumption, light weight, space saving, etc., as compared with other display devices, and therefore are widely used as display devices for personal computers, car navigation devices, television devices, various types of office automation appliances, etc.

Every year, such devices are becoming more and more multifunctional and achieving higher performance, improved convenience, reduction in cost, etc. In accordance with such progress, there is a demand for further improvement of the liquid crystal display devices in terms of performance, low power consumption, light weight, space saving, low cost, etc.

Liquid crystal display devices are normally equipped with an illumination unit including various light sources in order to achieve a bright display screen, and the illumination unit irradiates a liquid crystal panel with light from behind. Such illumination units are roughly classified into two different types depending on where light sources are attached. One is an edge light type in which the light sources are arranged along a side edge of a light guide plate, and the other is a direct type in which the light sources are arranged behind the light guide plate. Of these two types, the edge light type is excellent in reduced thickness and brightness uniformity on an illuminated surface, and therefore is adopted in many devices for which slimness is a high priority. Meanwhile, the direct type is capable of accommodating a large-sized light source, and therefore is adopted in devices that require high brightness.

In such illumination units, leads for power supply use are extracted from the liquid crystal display devices in order to supply power to the light sources. If such a lead is pulled from outside, that force may be directly transmitted to a connection point between a terminal of the light source and the lead and result in disconnection, contact failure, or the like.

In order to eliminate such problems, a means for fixing a lead is provided at a position close to an opening of a body case through which the lead is extracted.

Such a fixing means is normally constructed of holding members provided at corners of a frame-shaped supporting structure, in which the holding members are used to fix the lead (see, for example, Patent Document 1).

Figure 5:
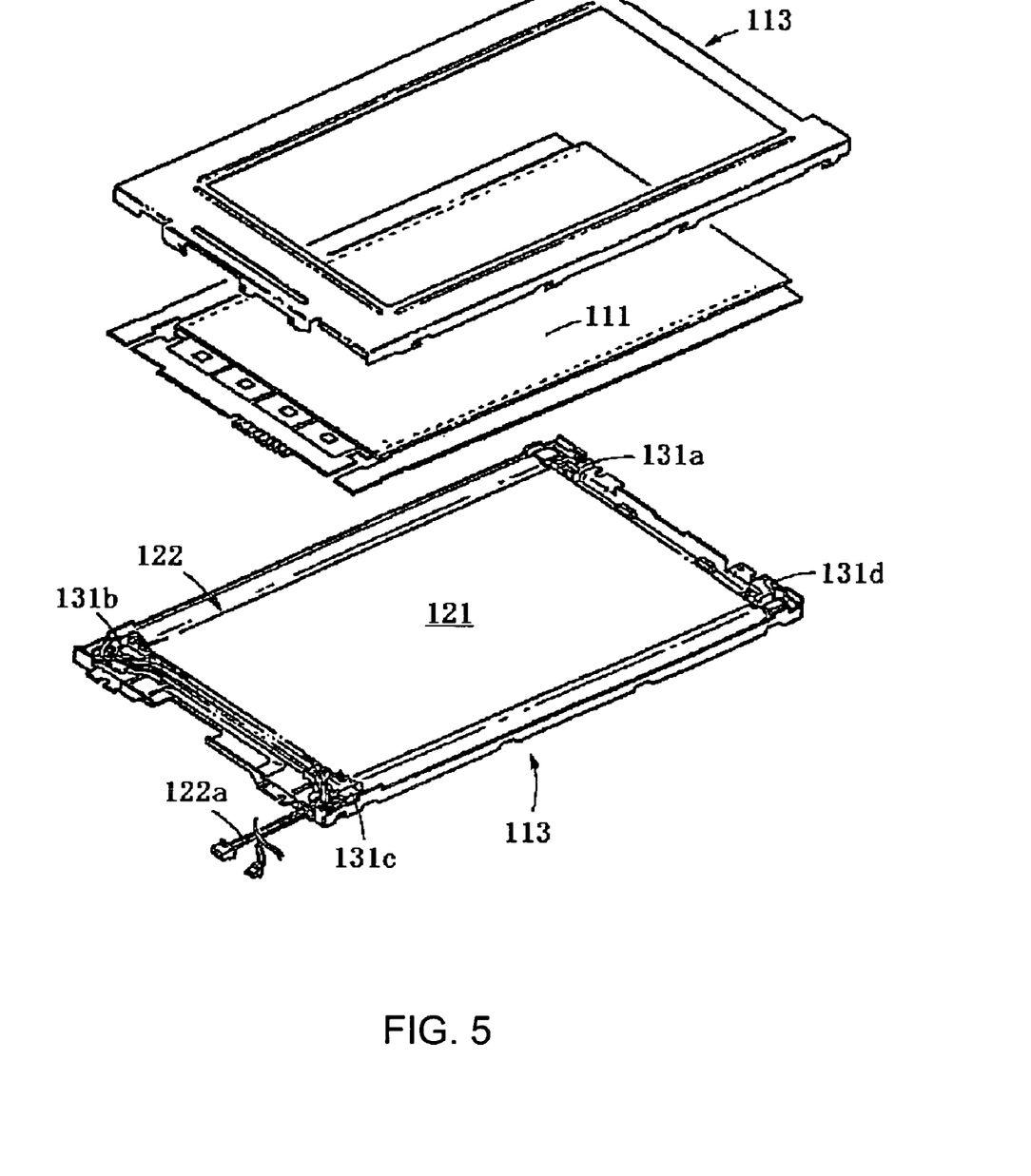
FIG. 5 is a perspective view of a liquid crystal display device as described in Patent Document 1.

FIG. 5 is a perspective view of a liquid crystal display device as described in Patent Document 1 below, and in this device, holding members 131a to 131d are provided at the corners of a frame-shaped supporting structure 113 that supports a light guide plate 121, and these holding members 131a to 131d are used to position a liquid crystal display panel 111, the light guide plate 121, and a light source 122, and further, two of the holding members 131b and 131c can be used to fix a lead 122a.

Also known is a liquid crystal display device in which a lead fixing part is formed directly on a supporting structure without employing a holding member that is constructed separately from the supporting structure (see, for example, Patent Document 2).

Figure 6:
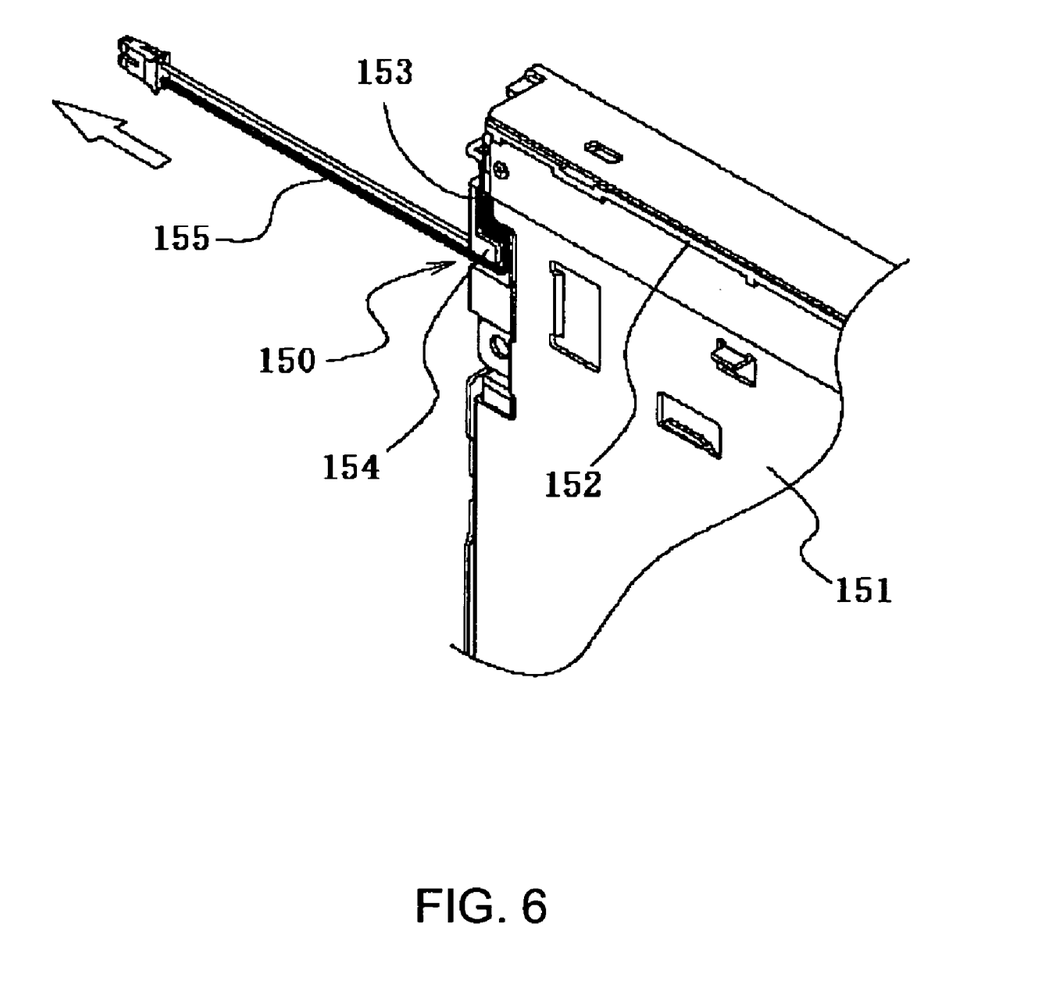
FIG. 6 is an enlarged perspective view of a lead fixing part of a liquid crystal display device as described in Patent Document 2.

FIG. 6 is an enlarged perspective view of a lead fixing part of a liquid crystal display device as described in Patent Document 2 below. An intermediate frame 152 is exposed from a metal frame 151 at a position close to an insertion hole for a light source part, and a lead fixing part 150 is formed on the intermediate frame 152. This fixing part 150 is constructed of a groove 153 and a lead supporting part 154. It is so constructed that a lead 155 extended from the light source part can be bent 90 degrees so as to extend along a side of the intermediate frame 152 and arranged at one end of the groove 153, then housed in a state in which it is bent along bending points within the groove 153, and drawn out at the other end of the groove 153 to the outside of the device.

Patent Document 1 JP-A-5-66390 (FIG. 2, paragraph [0007])

Patent Document 2 JP-A-2003-223110 (FIG. 2, paragraphs [0022] to [0025])

DISCLOSURE OF THE INVENTION

Problems to be Solved by the Invention

These liquid crystal display devices enable easy removal and attachment of the leads at the time of removal and attachment of the light sources, and also can prevent a problem such as disconnection from occurring. However, in the liquid crystal display device as described in Patent Document 1, a plurality of fixing members constructed separately from the supporting structure are used as the lead fixing parts, and some of them also serve as the lead fixing parts. Thus, the number of parts used is large and the assembly thereof and the fixing of the leads is cumbersome. Meanwhile, in the liquid crystal display device as described in Patent Document 2, the lead fixing part is formed on an intermediate frame, and therefore the metal frame needs to be processed in accordance with the shape of the intermediate frame. That processing is cumbersome.

As such, the present invention has been made in order to solve the above-described problems of the related art, and an object of the invention is to provide a liquid crystal display device in which the fixing of a lead extracted from a housing can be easily achieved.

Means to Solve the Problems

To solve the above problems, a liquid crystal display device according to claim 1 of the present application is a liquid crystal display device that includes a liquid crystal display panel and an illumination unit that irradiates the liquid crystal display panel, wherein the illumination unit includes a housing having a rectangular bottom wall surface and cut and erected pieces formed at its side peripheral edge part by cutting out a part of the bottom wall surface and projecting the cut-out part from a rear surface, an illuminating member contained in the housing, and a frame-shaped intermediate frame that fixes the illuminating member and has at its central part a display window; that the intermediate frame has, at positions corresponding to the cut and erected pieces, locking pieces that are to be inserted into opening parts that result when cutting out and erecting the cut and erected pieces; and that clearances that are formed, when the intermediate frame has been fixed to the housing, between the cut and erected pieces and the locking pieces form a lead fixing part for holding and fixing leads extracted from the illuminating member.

An invention according to claim 2 of the present application is based on the liquid crystal display device as recited in claim 1, wherein the lead fixing part is provided on the side peripheral edge part at a position close to a position where the leads are extracted from the illumination unit.

An invention according to claim 3 of the present application is based on the liquid crystal display device as recited in claim 1, wherein the housing is formed of a sheet metal and the intermediate frame is formed of a synthetic resin material.

An invention according to claim 4 of the present application is based on the liquid crystal display device as recited in claim 1, wherein the lead fixing part is provided on the side peripheral edge part at a position close to a position where the leads are extracted from the illumination unit, and that the housing is formed of a sheet metal and the intermediate frame is formed of a synthetic resin material.

An invention according to claim 5 of the present application is based on the liquid crystal display device as recited in claim 1, wherein each of the intermediate frame and the housing includes locking means to be joined together.

An invention according to claim 6 of the present application is based on the liquid crystal display device as recited in claim 1, wherein the lead fixing part is provided on the side peripheral edge part at a position close to a position where the leads are extracted from the illumination unit, and that each of the intermediate frame and the housing includes locking means to be joined together.

An invention according to claim 7 of the present application is based on the liquid crystal display device as recited in claim 1, wherein the housing is formed of a sheet metal and the intermediate frame is formed of a synthetic resin material, and that each of the intermediate frame and the housing includes locking means to be joined together.

An invention according to claim 8 of the present application is based on the liquid crystal display device as recited in claim 1, wherein the lead fixing part is provided on the side peripheral edge part at a position close to a position where the leads are extracted from the illumination unit, that the housing is formed of a sheet metal and the intermediate frame is formed of a synthetic resin material, and that each of the intermediate frame and the housing includes locking means to be joined together.

Effect of the Invention

According to the invention of claim 1, a simple processing of part of the housing and the intermediate frame of the illumination unit enables the fixing of the leads. Specifically, the locking pieces of the intermediate frame and the cut and erected pieces of the housing enable the fixing of the leads, and therefore, there is no need to employ a separate fixing member as in known techniques, and the need to form the intermediate frame in a complicated shape is eliminated.

As a result, it is possible to form the lead fixing part by a simple processing of part of the housing and the intermediate frame without either increasing the number of parts or employing an intermediate frame in a complicated shape. Moreover, since the lead fixing part can be formed when placing the intermediate frame in the housing, the lead fixing part can be formed without a special assembling or the like.

According to the invention of claim 2, it is possible to efficiently fix, at a position close to the light sources of the illuminating member, the leads connected to the light sources.

According to the invention of claim 3 or 4, the effect of the invention of claim 1 or 2 is obtained and, in addition, it is extremely easy to form the cut and erected pieces and the locking pieces.

Further, according to the invention as recited in one of claims 5 to 8, the effect of the invention as recited in one of claims 1 to 4 is obtained and, in addition, the lead fixing part can be formed when placing the intermediate frame in the housing, and the joining together of the intermediate frame and the housing by the locking means makes it possible to prevent the lead fixing part from moving.

DESCRIPTION OF REFERENCE NUMERALS

1 Liquid crystal display device
4 Lead
$4_0$ Tube
10 Illumination unit
11 Housing
12 Bottom wall
$12_1$ and $12_2$ Projections
$13_1$ to $13_4$ Side walls
$14_1$ and $14_2$ Cut and erected pieces
$14_0$ Opening
$15_1$ Locking opening
17 Back cover
20 Intermediate frame
$20_1$ to $20_4$ Frame sides
$21_3$ and $21_4$ Side walls
$22_1$ Locking hook
$23_1$ Locking piece
30 Outer frame
$30_1$ to $30_4$ Frame sides

BEST MODE FOR CARRYING OUT THE INVENTION

Hereinafter, specific examples of the present invention will be described in detail with reference to an embodiment thereof and the drawings. However, it is to be noted that the embodiment as described below simply illustrates a liquid crystal display device for embodying the technical concept of the present invention, and that the present invention is not meant to be limited thereto but is equally applicable to other embodiments within the scope of the claims.

Embodiment 1

Figure 1:
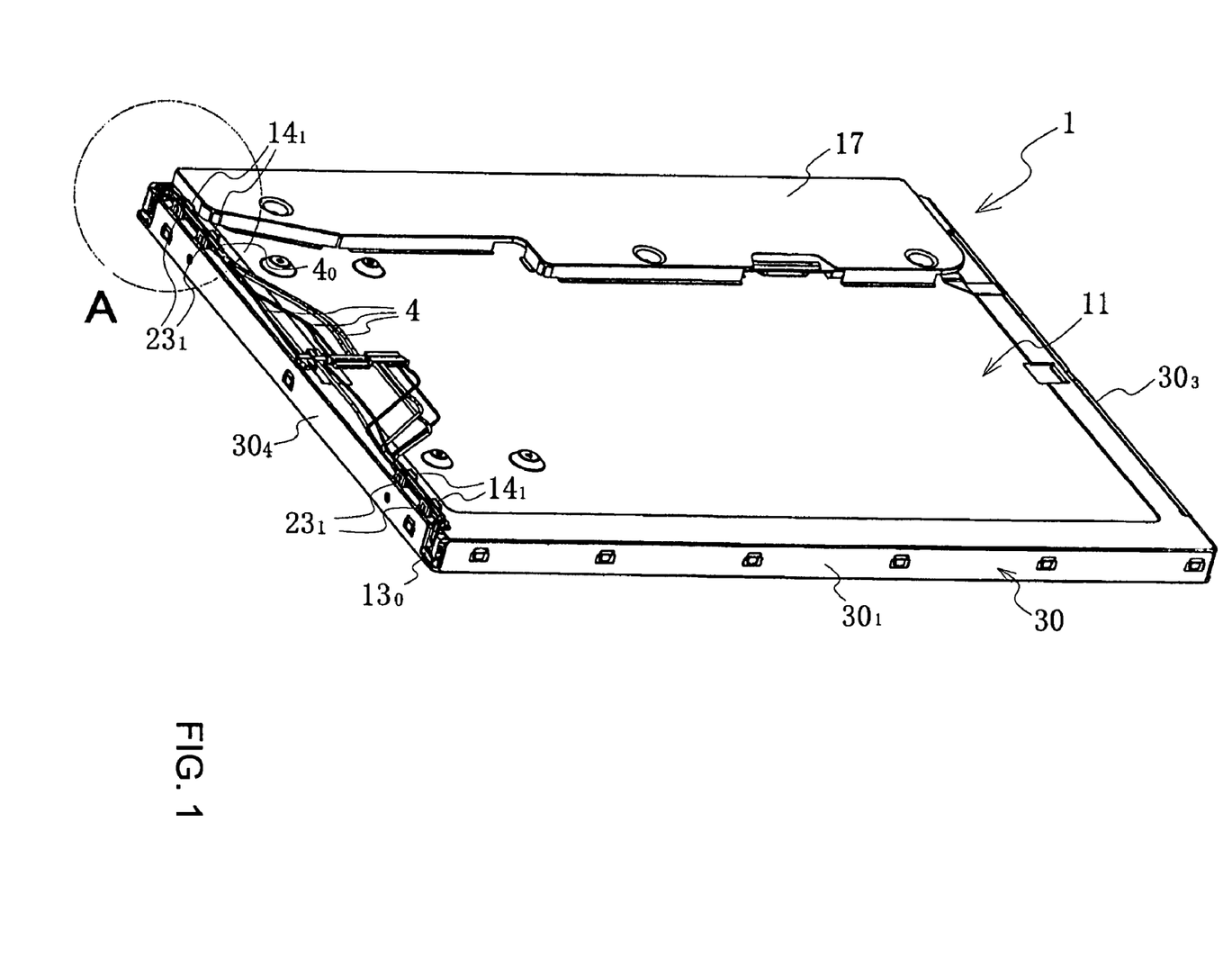
FIG. 1 is a rear perspective view of a liquid crystal display device according to one embodiment of the present invention.
Figure 2:
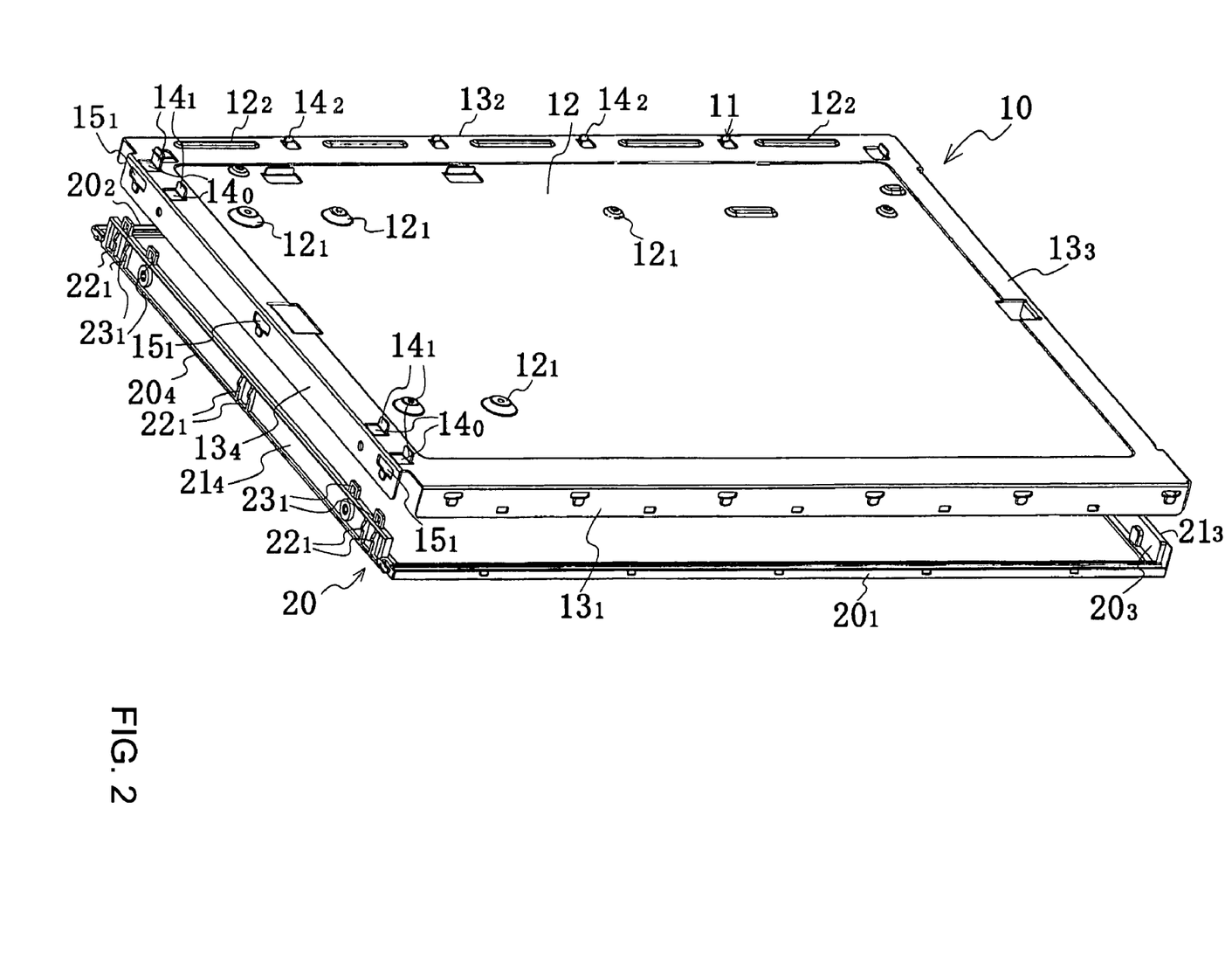
FIG. 2 is an exploded perspective view illustrating the liquid crystal display device of FIG. 1 in a disassembled state.
Figure 3:
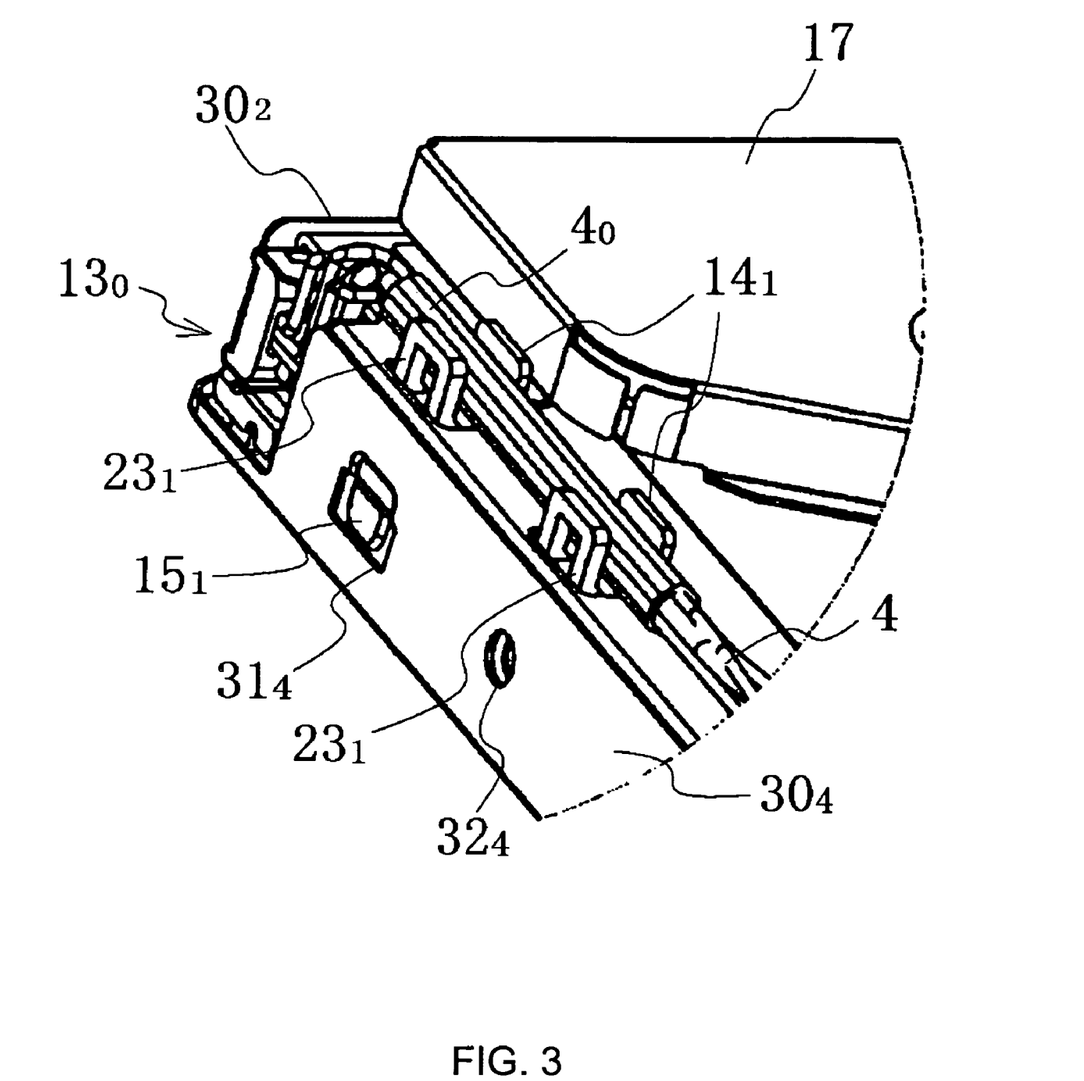
FIG. 3 is an enlarged perspective view of portion A as indicated in FIG. 1.
Figure 4:
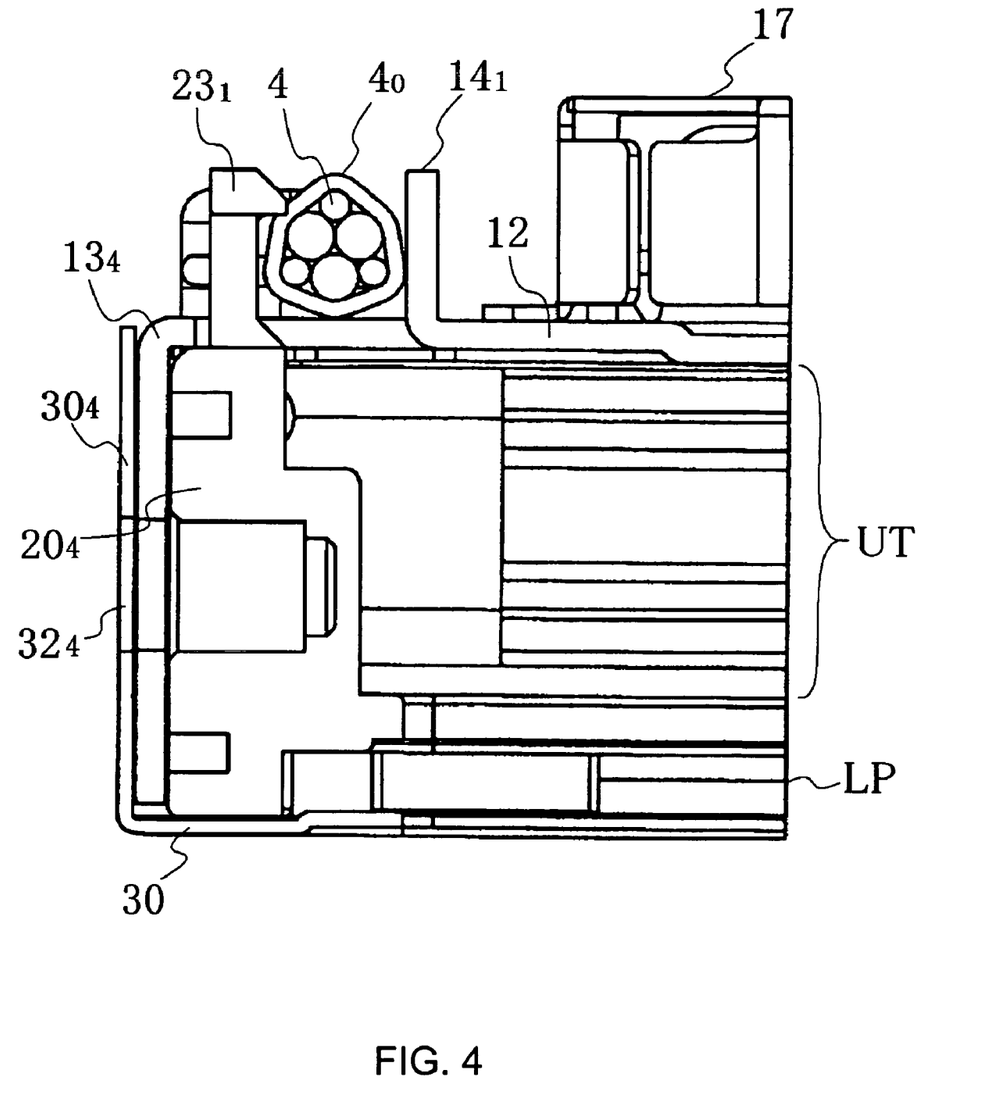
FIG. 4 is an enlarged cross-sectional view of a lead fixing part of the liquid crystal display device.

FIG. 1 is a rear perspective view of a liquid crystal display device according to one embodiment of the present invention; FIG. 2 is an exploded perspective view illustrating the liquid crystal display device of FIG. 1 in a disassembled state; FIG. 3 is an enlarged perspective view of portion A as indicated in FIG. 1; and FIG. 4 is an enlarged cross-sectional view of a lead fixing part of the liquid crystal display device. Note that in FIG. 2, only an illumination unit is illustrated while a circuit board, a liquid crystal display panel, a back cover, and an outer frame are removed.

As illustrated in FIG. 1, a liquid crystal display device 1 according to the present invention includes an illumination unit 10 (see FIG. 2), a liquid crystal display panel LP (see FIG. 4, which will be described later), an outer frame 30, and a back cover 17.

As the liquid crystal display panel LP, one similar to a known liquid crystal display panel is employed. The outer frame $30_1$ is a rectangular frame composed of frame sides $30_4$, to 304 for fixing the illumination unit 10 and the liquid crystal display panel LP as integral units, and the back cover 17 is a protective cover for protecting the circuit board placed at the rear of a housing.

As illustrated in FIG. 2, the illumination unit 10 includes a housing 11, an illuminating member UT contained in the housing 11 (see FIG. 4, which will be described later), and a frame-shaped intermediate frame 20 disposed above the illuminating member UT to fix the illuminating member UT. At the rear of the housing 11, a circuit board (not shown) on which liquid crystal driving circuit elements are mounted is placed, and the circuit board is covered by the back cover 17.

As illustrated in FIG. 2, the housing 11 includes a rectangular bottom wall 12 and side walls $13_1$ to $13_4$ that are formed by being bent and erected along an outer perimeter of the bottom wall surface and have a predetermined height. The housing 11 has the shape of a shallow box with an open top, and is formed by sheet metal working. In the side walls $13_1$ to $13_4$, a predetermined gap $13_0$ is formed at each corner of the housing 11, and a lead 4 is extracted through the gap $13_0$. The housing 11 is formed to be large enough to contain the illuminating member UT described later.

On the bottom wall 12 of the housing 11, a plurality of projections $12_1$ and $12_2$ and a plurality of cut and erected pieces $14_1$ and $14_2$ which project from a rear surface are formed at positions close to the outer perimeter of the bottom wall surface. The plurality of projections $12_1$ and $12_2$ serve to support the liquid crystal display device 1 so as to be level when it is placed on a desk or the like, and each of the projections $12_1$ and $12_2$ has the same height. The plurality of cut and erected pieces $14_1$ and $14_2$ are each formed by cutting out a predetermined region of the bottom wall surface and erecting a part of the cut-out piece in a rearward direction. Of them, the cut and erected pieces $14_1$ provided at the side wall $13_4$ of the housing 11 are used as a part of a lead 4 fixing part.

As illustrated in FIG. 4, openings $14_0$ of the bottom wall 12 that result when forming the cut and erected pieces $14_1$ are formed to have a size suitable for locking pieces $23_1$, which are inserted therein and will be described later, of the intermediate frame 20. Cut-out openings that result when forming the cut and erected pieces $14_1$ as they are may be used as the openings $14_0$, or alternatively, the cut-out openings may be further enlarged by an additional process. The size of the openings $14_0$ is determined based on the thickness and the number of leads 4.

A plurality of locking openings $15_1$ are formed in each of the shorter-length side walls $13_3$ and $13_4$ of the housing 11. These locking openings $15_1$ are engaged with locking hooks $22_1$ of the intermediate frame 20.

The intermediate frame 20 is engaged with the side walls $13_1$ to $13_4$ of the housing 11 to cover an upper opening of the housing 11 and fix the illuminating member UT contained within the housing 11, and is made of synthetic resin.

The intermediate frame 20 is composed of frame sides $20_1$ to $20_4$ of two different lengths, and the frame sides $20_1$ to $20_4$ are all formed to have a narrow width. The frame sides $20_1$ to $20_4$ are formed to have the shape of a frame so that a rectangular display window is formed at a central part thereof. Of these frame sides $20_1$ to $20_4$, the frame sides of the opposite shorter-length sides $20_3$ and $20_4$ have erected thereon side walls $21_3$ and $21_4$ having a predetermined height, and these side walls $21_3$ and $21_4$ have formed thereon a plurality of locking hooks $22_1$. The locking hooks $22_1$ are formed on a side of each of the side walls $21_3$ and $21_4$.

As illustrated in FIG. 4, the illuminating member UT is composed of a reflection sheet placed on the bottom wall surface of the housing 11, a light guide plate disposed on the reflection sheet, light sources (not shown) arranged along opposite sidewall faces of the light guide plate, an optical sheet disposed on the light guide plate, and the intermediate frame 20 for positioning and fixing the light guide plate and the optical sheet. A plurality of leads 4 are extended from each light source.

The reflection sheet has substantially the same size as that of the bottom wall surface of the housing 11, and is made of a white resin film having a high reflectivity. The light guide plate is a rectangular plate-shaped body with a predetermined thickness, and is formed, for example, of a milk white acrylic resin. The optical sheet is composed of a plurality of sheets, e.g., a diffuser sheet and a condenser sheet, and is formed to have substantially the same size as that of the light guide plate.

A process of assembling the liquid crystal display device 1 of the present invention will now be described in detail below. First, the illuminating member UT is housed in the housing 11 of the illumination unit 10. Specifically, the reflection sheet is placed on the bottom wall surface of the housing 11, the light guide plate is disposed thereon, and further the plurality of optical sheets are laminated on the light guide plate. In addition, the light sources (not shown) are arranged along the sidewall faces of the light guide plate, and the plurality of leads 4 connected to the light sources are extracted through one of the gaps $13_0$ of the housing 11 to the rear of the housing 11. Next, the optical sheets are held at one side edge by the intermediate frame 20, and the locking hooks $22_1$ of the intermediate frame 20 are engaged with and fixed to the locking openings $15_1$ of the housing 11.

Thereafter, the liquid crystal display panel LP is fit within the intermediate frame 20, the outer frame 30 is provided to cover an outer peripheral part of a surface of the liquid crystal display panel LP, and the outer frame 30 is fixed to the housing 11 using fixing means such as screws.

As a result of this assemblage, the plurality of locking pieces $23_1$ of the intermediate frame 20 project from the rear of the housing 11 through the openings $14_0$ of the housing 11, and clearances are formed between the locking pieces $23_1$ and the cut and erected pieces $14_1$ of the housing 11. As illustrated in FIG. 1, FIG. 3, and FIG. 4, the leads 4 extended from each light source are held and fixed in these clearances.

As illustrated in FIG. 3 and FIG. 4, it is preferable that the plurality of leads 4 be collectively inserted and secured in a tube 40 that has flexibility. It is also preferable that tops of the locking pieces $23_1$ have the shape of a hook, thereby protecting the leads 4 and preventing the leads 4 from getting out of the clearances at the same time.

The invention claimed is:

1. A liquid crystal display device comprising
a liquid crystal display panel and
an illumination unit that irradiates said liquid crystal display panel,
said illumination unit including
a housing having a rectangular bottom wall surface and cut and erected pieces formed at its side peripheral edge part by cutting out a part of said bottom wall surface and projecting the cut-out part from a rear surface, an illuminating member contained in said housing, and an intermediate frame that fixes said illuminating member and has at its central part a display window;

said intermediate frame having, at positions corresponding to said cut and erected pieces, locking pieces that are to be inserted into openings that result when cutting out and erecting said cut and erected pieces; and clearances that are formed, when said intermediate frame has been fixed to said housing, between said cut and erected pieces of said housing and said locking pieces of said intermediate frame forming a lead fixing part for holding and fixing leads extracted from said illuminating member.

2. The liquid crystal display device according to claim 1, wherein said lead fixing part is provided on the side peripheral edge part at a position close to a position where said leads are extracted from said illumination unit.

3. The liquid crystal display device according to claim 1, wherein said housing is formed of a sheet metal and said intermediate frame is formed of a synthetic resin material.

4. The liquid crystal display device according to claim 1, wherein said lead fixing part is provided on the side peripheral edge part at a position close to a position where said leads are extracted from said illumination unit, and said housing is formed of a sheet metal and said intermediate frame is formed of a synthetic resin material.

5. The liquid crystal display device according to claim 1, wherein each of said intermediate frame and said housing includes locking means to be joined together.

6. The liquid crystal display device according to claim 1, wherein said lead fixing part is provided on the side peripheral edge part at a position close to a position where said leads are extracted from said illumination unit, and each of said intermediate frame and said housing includes locking means to be joined together.

7. The liquid crystal display device according to claim 1, wherein said housing is formed of a sheet metal and said intermediate frame is formed of a synthetic resin material, and each of said intermediate frame and said housing includes locking means to be joined together.

8. The liquid crystal display device according to claim 1, wherein said lead fixing part is provided on the side peripheral edge part at a position close to a position where said leads are extracted from said illumination unit, said housing is formed of a sheet metal and said intermediate frame is formed of a synthetic resin material, and each of said intermediate frame and said housing includes locking means to be joined together.

* * * * *